UNITED STATES PATENT OFFICE.

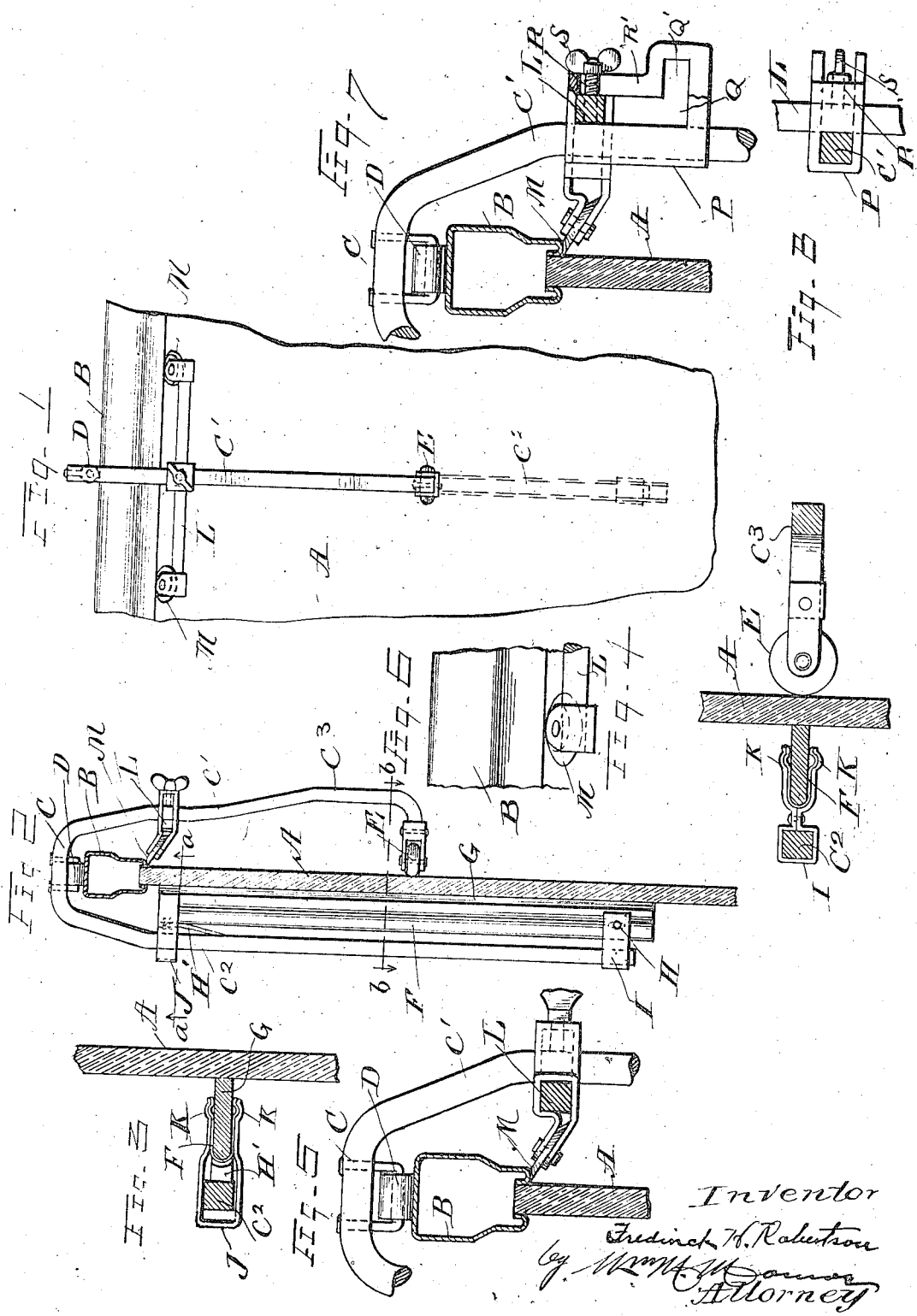

FREDERICK H. ROBERTSON, OF CLEVELAND, OHIO.

WIND-SHIELD CLEANER.

1,279,444. Specification of Letters Patent. Patented Sept. 17, 1918.

Application filed March 28, 1917. Serial No. 158,070.

*To all whom it may concern:*

Be it known that I, FREDERICK H. ROBERTSON, a citizen of the United States, and resident of Cleveland, in the county of Cuyahoga and State of Ohio, have invented certain new and useful Improvements in Wind-Shield Cleaners, of which I hereby declare the following to be a full, clear, and exact description, such as will enable others skilled in the art to which it appertains to make and use the same.

The objects of the invention are to provide an improved form of wind shield cleaner which can readily be attached to any modern form of windshield and which combines the advantages of perfect contact with the surface of the glass shield with ease of movement and is guided upon the frame of the wind shield without doing any injury to the enamel or finish thereof.

The invention is adaptable to use with the wind shield of vehicles of any character but is exemplified in its use in the wind shield of an automobile, and movable upon the upper edge of its frame.

The invention comprises the combination and arrangement of parts and construction of the several detail parts, hereinafter described, shown in the accompanying drawings and specifically pointed out in the claims.

In the accompanying drawings Figure 1 is a rear elevation of the device; Fig. 2 is a vertical transverse section of the wind shield showing the device applied thereto; Fig. 3 is a horizontal section on line $a$—$a$ Fig. 2 showing the equalizing spring which presses the upper end of the wiping or rubbing device into contact with the glass; Fig. 4 is a similar section on the line $b$—$b$ Fig. 2 taken through the pivoted end of the wiping device; Fig. 5 is an enlarged portion of Fig. 2 showing the guide roller; Fig. 6 is a rear elevation of one roller; Fig. 7 is a similar section to Fig. 2 showing a modified form; Fig. 8 is a plan thereof.

In these views A represents the wind shield, B is the frame upon the upper edge thereof, C is a rod or bar formed of spring metal which is bent to form arms C', C² which extends downward upon both sides of the wind shield, and which rolls upon the upper edge of the frame at D.

The inner arm C' of this bar is provided with a roller E which traverses the inner face of the wind shield as the device is moved from one point to another thereon.

The outer arm C² of the device is longer than the inner arm so as to extend below it, and a supporting back member or keeper F which supports the wiping strip G is secured thereto at its upper and lower ends in such a manner as to make the wiping strip automatically hug the outer face of the glass.

The lower end of the support or keeper for the wiping strip is pivoted at H in the gripping member I which is secured upon the lower extremities of the outer arm C².

The gripping member and supporting back for the wiping strip are preferably formed of spring metal so that the wiping strip can be removed when worn out and another substituted therefor. At the upper end the supporting back F is secured between the sides of a gripping member J and a spring H' attached preferably to the back F engages the rod C² and always tends to press the upper end of the wiping strip into contact with the glass.

This spring attachment is required, since otherwise the action of the spring arms would confine the pressure to the lower ends thereof, and only the lower edge of the wiping strip would make contact with the glass.

Therefore, by pivoting the lower end of the back piece F and placing the upper end under spring pressure, the entire wiping edge will be made to contact with the glass surface under pressure.

The gripping strip and back member for the wiping strip are preferably ribbed or corrugated at K, K, so as to make the connection rigid and secure. The longer arm C² serves as a brace for the device to prevent tilting the member C transversely of the wind shield and compels the roller to move in the center only, which could not occur if the arms were of the same length.

To prevent the device from swinging backward and forward upon the roller when operating, a rigid bar L is centrally attached to the inner arm C, substantially opposite the spring and rollers M, M, having knife edge rollers pivoted upon their extremities.

These knife edges engage the underside of the frame and prevent the device from lifting when operated and also serve the dual purpose of maintaining the wiper strip at right angles to the glass surface in which position it slides most easily and also prevents the device from swinging upon the guide roller.

The bar L is movable up and down upon the arm C' and an offset C³ in the lower extremity of this arm permits the rollers to be drawn down thereon when it is desired to release the device from the wind shield.

The spring action of the arms and of the spring serves to keep the rollers in close contact with the glass and with the corner between the glass and edge of the frame, so that while the device moves easily it is retained in accurate vertical alinement and cannot be twisted or swung out of place.

In Figs. 7 and 8 a modified form of support P for the cross bar is shown, which is provided with the vertical slot Q having an extension at an angle at Q' to permit the bar L to be dropped and withdrawn so that the cleaning device can be released from the wind shield, a stud R movable in a slot R' is secured in place by means of a nut S.

When this device is used it will not be necessary to bend the U shaped rod C' outwardly.

Having described the invention, what I claim as new and desire to secure by Letters Patent is:

1. In a cleaning device for a glass wind shield, the combination with an integral U shaped spring bar provided with a roller adapted to traverse the frame of said wind shield, the extremities of said bar bent substantially parallel to each other to overlap the sides of said wind shield, one arm being longer than the other, of a wiping strip attached to the longer arm, and a glass engaging means on the lower end of the short arm, the elongated arm tending to prevent tilting the cleaning device transversely of the wind shield, a rigid bar centrally and adjustably secured upon said short arm and rollers spaced thereon engaging the inner edge of said frame.

2. In a wind shield cleaner, a U shaped spring bar one of its arms being longer than the other, a roller mounted thereon and adapted to traverse the frame of said wind shield, a roller at the extremity of said short arm engaging the inner face of said wind shield, and a wiping strip pivotally secured to the lower end of said longer arm, a spring interposed between the upper end of said wiping strip and its attached arm, and spaced guiding and retaining means secured to one of said arms and engaging said frame at the angle thereof with the glass, said guiding and retaining means preventing vertical and oscillatory movement thereof.

3. In a cleaner for a wind shield having a frame, a U shaped spring bar, one arm thereof engaging the inner side of said shield at its inner end, a wiping strip pivotally attached to the lower end of the other arm, and a spring interposed between the upper end of said wiping strip and its attached arm, a cross bar on one arm having rollers at its outer extremities engaging the lower edge of the upper bar of said frame, and securing means for said cross bar.

4. In a wind shield cleaner a U-shaped spring bar, one of its arms being longer than the other, a roller mounted thereon intermediate of the arms and adapted to traverse the edge of the frame of said wind shield, a roller at the extremity of said short arm engaging the inner face of said wind shield, a wiping strip pivotally secured to the lower end of the longer arm, a spring interposed between the upper end of said wiping strip and its attached arm, and a laterally spaced means secured to one of said arms and engaging said frame at the angle of the inner edge thereof with the wind shield, preventing vertical and oscillating movement of said cleaner, substantially as described.

5. In a cleaner for a wind shield having a frame, in combination, a U shaped spring bar having inner and outer arms, one arm thereof engaging the inner face of said shield at its lower end, a wiping edge attached to the other arm, a rigid cross bar secured to the inner arm, and a roller at each extremity thereof, each roller engaging the lower edge of the upper bar of said frame, said inner arm bent outwardly at its lower end.

6. In a cleaner for a wind shield having a frame, in combination, a U shaped bar, a roller mounted thereon intermediate of the arms, and adapted to traverse the edge of the frame of said wind shield, a roller pivoted in the lower extremity of the inner arm, a wiping strip and backing therefor pivotally attached to the outer arm, a spring interposed between the upper end of said backing and the arm, and a rigid cross bar secured at its center to one of said arms adjacent to its upper end, rollers pivoted thereon, said rollers being equally spaced from the said arm and engaging the inner edge of said frame.

7. In a cleaning device for a wind shield having a frame, a U shaped bar movable on said frame, a roller on the inner arm thereof engaging the inner side of said wind shield, a wiping device attached to the outer arm, a rigid cross bar secured upon one of said arms, spaced rollers thereon having bevel edges adapted to engage the lower edge of the upper bar of said frame.

8. In a cleaning device for a wind shield, having a frame, a U shaped bar slidable on said frame, one arm thereof engaging the inner side of said wind shield, a wiping device pivoted to the lower end of the other arm, a rigid cross bar secured to the first named arm, and knife edged engaging means spaced upon said cross bar, said engaging means entering the angle between the inner edge of said frame and the vertical face of the wind shield.

In testimony whereof I hereunto set my hand this 22nd day of March, 1917.

FREDERICK H. ROBERTSON.

In presence of—
R. W. JEREMIAH,
WM. M. MONROE.